Nov. 23, 1965 T. T. TRUE 3,219,846

SAWTOOTH WAVEFORM GENERATOR

Filed Jan. 16, 1963 3 Sheets-Sheet 1

INVENTOR:
THOMAS T. TRUE,

BY Frank J. Thompson
HIS ATTORNEY

SAWTOOTH WAVEFORM GENERATOR

Filed Jan. 16, 1963 3 Sheets-Sheet 2

INVENTOR:
THOMAS T. TRUE,

BY Frank J. Thompson
HIS ATTORNEY.

INVENTOR:
THOMAS T. TRUE,
BY Frank J. Thompson
HIS ATTORNEY.

3,219,846
SAWTOOTH WAVEFORM GENERATOR

Thomas T. True, Camillus, N.Y., assignor to General Electric Company, a corporation of New York Filed Jan. 16, 1963, Ser. No. 251,940
10 Claims. (Cl. 307—106)

This invention relates to sawtooth waveform voltage generators and more particularly to means for improving the linearity of the output waveform of such generators.

In some electrical systems which utilize electron beam display devices, a highly linear and relatively high voltage sawtooth beam deflection voltage is required to establish the requisite electric field gradient to control the path of the electron beam. While the required peak-to-peak excursions and frequency of the sawtooth waveform vary from one individual electrical system to another, it is not uncommon to have a demand for voltage excursions in excess of 1,000 volts and frequencies in the order of the commercial television horizontal sweep frequency of 15.75 kc. For example, a system having these requirements is a light valve projection apparatus, one type of which is described in copending application Serial No. 177,658, filed March 5, 1962, and assigned to the assignee of the present invention.

Conventional sawtooth waveform voltage generators generally have an output, or final, stage comprising a voltage-controlled device such as a vacuum tube, transistor, thyratron, or the like. Known circuits of this type have many disadvantages, including excessive power consumption by the voltage-controlled device and the need for a device suitable for handling high voltages and high peak power.

A particularly desirable high level sawtooth waveform voltage generator contains no voltage-controlled devices in the output stage and the output stage is adapted to be coupled directly to a load circuit, such as the deflection plates of an electron beam display device. One generator of this type is that described in the copending application Serial No. 197,505, filed May 24, 1962, and assigned to the assignee of the present invention. In the generator described in this copending application, a source of high voltage pulses, comprising an inductor and means for periodically causing the establishment and collapse of the magnetic field of the inductor, supplies a receptive network including a parallel resonant circuit. The resonant circuit is coupled to the source of pulses by an asymmetrically conducting device, such as a diode, whereby the resonant circuit is isolated and oscillates after each pulse. By providing a parallel resonant circuit having a natural frequency of oscillation many times lower than the frequency with which the pulses occur, the trace portion of a sawtooth waveform is generated corresponding to a relatively small portion of a sine wave adjacent a zero crossing, where a high degree of linearity obtains.

Such a generator is capable of providing a high level sawtooth waveform voltage directly to a load, such as a deflection plate. The trace portion of the sawtooth waveform is hightly linear when the frequency of the resonant circuit is made much less than the frequency with which the pulses occur. But, it is sometimes desirable to provide a high level sawtooth waveform voltage having even greater linearity than is practicable with generators of the aforementioned type. In addition, it is sometimes desirable to increase the efficiency of the output stage of the generator by increasing the resonant frequency of the pulsed parallel resonant circuit, and at the same time maintain a high degree of linearity. This requires that some linearity compensating means be provided to retain the same high degree of linearity achieved with the lower resonant frequency. In addition, it is frequently essential or highly desirable that linearity correcting circuits derive their energy for operation from the same source as the output stage; that is to say, the source of pulses, to avoid the possibility of coupling extraneous signals into the output circuit of the generator.

Accordingly, it is an object of this invention to provide improved linearity for a sawtooth waveform generator of the pulsed resonant circuit type.

Another object of this invention is to provide for a sawtooth voltage generator of the type having a pulsed resonant circuit output stage linearity correcting means energized by the source of pulses.

A further object of this invention is to provide for a sawtooth voltage generator of the type having a pulsed resonant circuit output stage linearity correcting means whereby the resonant frequency of the resonant circuit may be increased while maintaining a high degree of linearity.

Yet another object of this invention is to provide a relatively high level, highly linear sawtooth waveform voltage generator of increased efficiency.

In accordance with the present invention, a pulsed resonant circuit sawtooth waveform generator is provided having sine wave and parabolic wave linearity corrections. Sine and parabolic correction voltages are derived from the energy of the source of pulses. Sine wave correction is provided by a network including a resonant circuit coupled across the output terminals of the generator and tuned to a frequency approximately equal to the repetition frequency of the sawtooth waveform. Parabolic correction is achieved by a network including a double integrating circuit coupled across the input terminals of the sawtooth waveform generator. The double integrating circuit has a resonant frequency considerably less than the frequency of the supplied pulses. The supplied pulses are initially integrated to provide a parabolic waveform voltage. A suitable coupling capacitor is provided to couple this voltage to the output of the sawtooth waveform generator, thereby adding a small voltage of parabolic waveform to a generated sawtooth output waveform.

Further objects, features and advantages of this invention will be apparent from a consideration of the following description taken in connection with the accompanying drawings in which.

Figure 1:
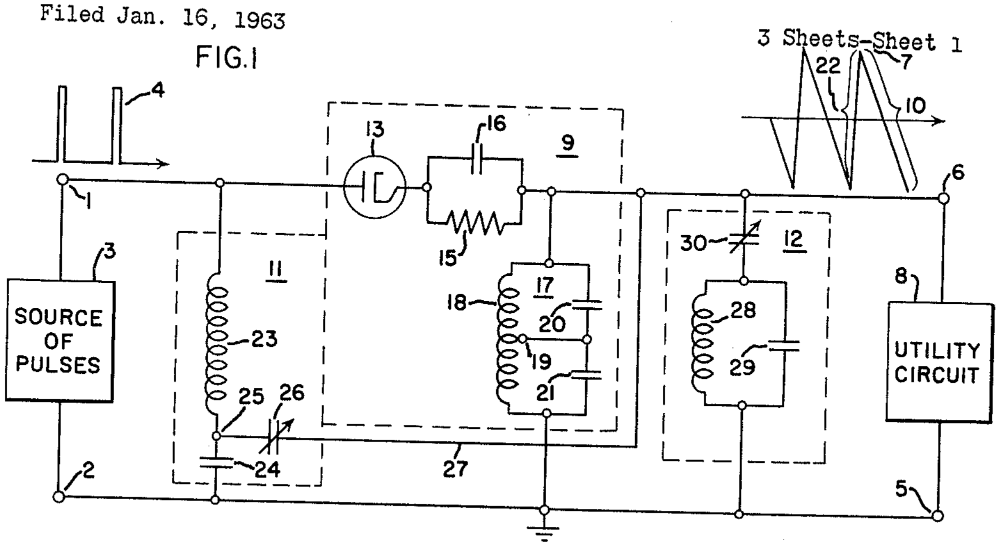
FIGURE 1 is a schematic diagram of a sawtooth waveform generator utilizing one embodiment of the present invention.
Figures 3A, 3B, 3C, 3D, 3E:
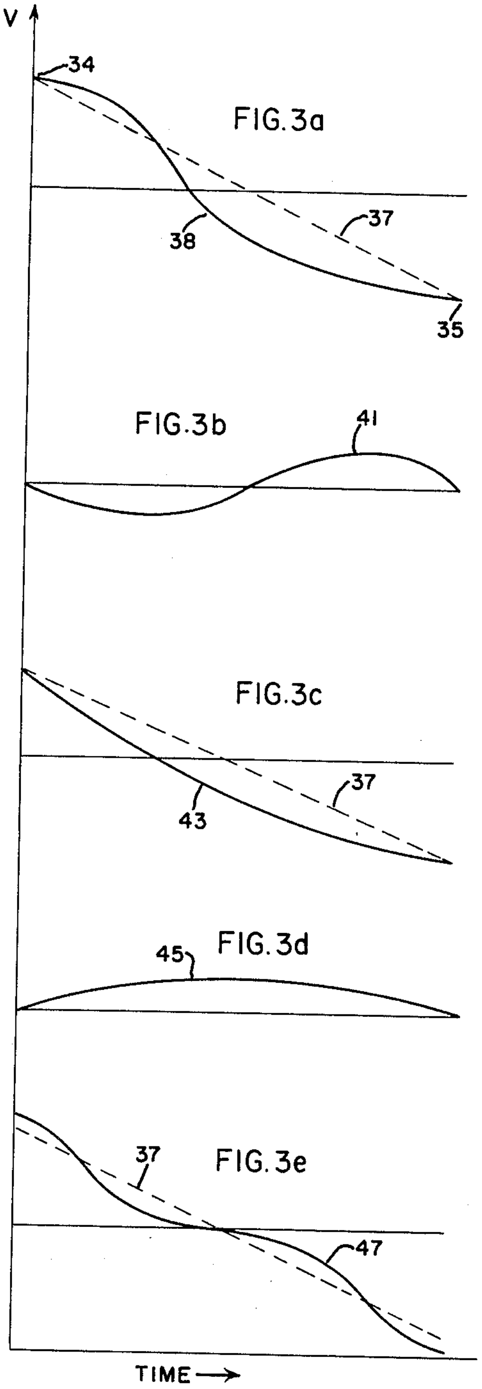
Figures 4A, 4B, 4C, 4D, 4E:
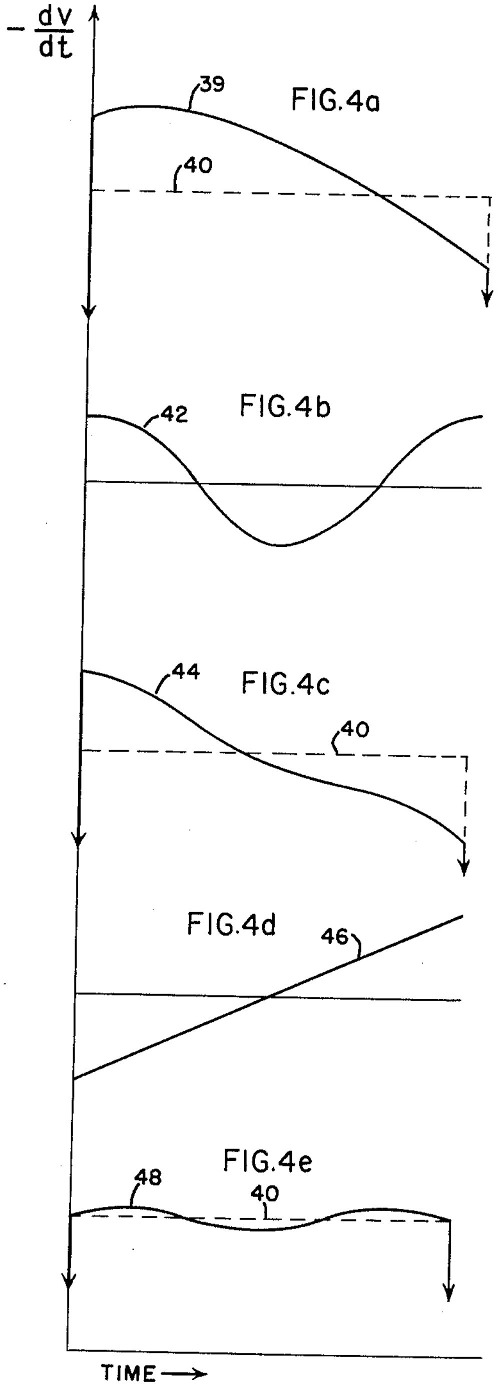
Figure 5:
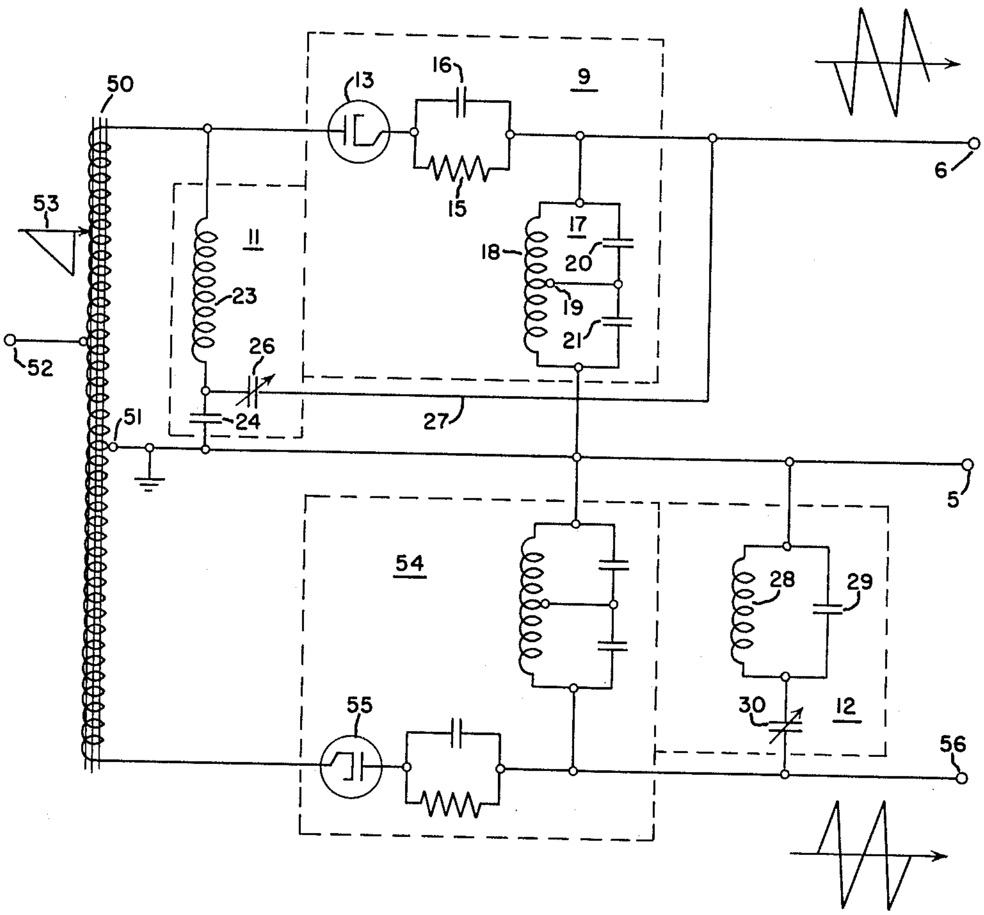

FIGURES 3*a*–3*e* illustrate graphically a plurality of voltage waveforms existing in the circuit of FIGURE 1;

FIGURES 4*a*–4*e* illustrate graphically the time derivative of the plurality of voltage waveforms illustrated in FIGURES 3*a*–3*e*; and FIGURE 5 is a schematic diagram of a sawtooth waveform voltage generator utilizing the present invention in another form.

FIGURE 1 shows schematically the output stage of a high level sawtooth waveform voltage generator. The output stage includes input terminals 1 and 2, which are coupled to a source 3 of high voltage pulses having an output voltage waveform such as 4. The output stage is responsive to pulses supplied at input terminals 1 and 2 to provide, at output terminals 5 and 6, a sawtooth waveform voltage output having a waveform such as 7 which is coupled to a utility circuit 8. Unless otherwise indicated in the following description, voltage waveforms will be referred to with reference to ground potential and it will be assumed that the circuit has been operating a sufficient length of time for establishing steady-state or equilibrium conditions.

In FIGURE 1, the primary conversion from a pulse waveform, such as shown at 4, to a sawtooth waveform, such as shown at 7, is accomplished by a pulse converter network generally shown at 9. In accordance with the present invention, increased linearity of a trace portion 10 of waveform 7 is provided by the parabolic waveform correction network, generally shown at 11, and the sinusoidal waveform correction network, generally shown at 12. Network 11 supplies a voltage of parabolic waveform to be added to the output voltage generated between output terminals 5 and 6 during the trace portion 10 and network 12 serves to subtract a voltage of sinusoidal waveform from the output during trace portion 10.

Pulse converter network 9 includes an asymmetrically conducting device, such as a diode 13, having anode and cathode electrodes. An anode electrode is connected to input terminal 1 and receives energy from the source 3 of positive pulses. The cathode electrode of diode 13 is connected to a diode biasing network comprising a resistor 15 and a capacitor 16 connected in a parallel circuit relationship. The network is completed by a parallel resonant circuit, generally shown at 17, connected from the diode biasing circuit to ground potential. As shown, parallel resonant circuit 17 includes an inductor 18 having a center tap 19 thereon, and capacitors 20 and 21 connected from center tap 19 to the respective extremities of inductor 18.

The specific pulse converter network 9 shown in FIGURE 1 is not the subject of the present invention but forms part of the subject matter of the aforementioned U. S. patent application Serial No. 197,505, filed May 24, 1962. Briefly stated, the occurrence of a positive pulse at terminal 1 causes the diode 13 to conduct and to transfer energy to resonant circuit 17. Upon termination of the positive input pulse, resonant circuit 17 is isolated from the input circuit by back-biased diode 13. Parallel resonant circuit 17 is thereby allowed to freely oscillate, or "ring," at its natural resonant frequency to provide trace portion 10 of voltage waveform 7. Since the natural resonant frequency of parallel resonant circuit 17 is many times less than the pulse repetition frequency, trace portion 10 represents only a small portion of a sine wave and may therefore have good linearity characteristics.

While the above-described pulse converter network is effective to provide a sawtooth waveform voltage output of good linearity from a source of pulses, particularly when the natural resonant frequency of parallel resonant circuit 17 is much less than the pulse repetition frequency, there are two inherent types of non-linearity present in the output of a sawtooth voltage generator utilizing such a network. First, there is a departure from linearity caused by loading of parallel resonant circuit 17 by any power-consuming utility network coupled to output terminals 5 and 6. Such loading causes energy to be extracted from parallel resonant circuit 17 during the partial oscillation thereof, resulting in a slightly concave trace portion 10 of voltage waveform 7. This distortion may be denominated parabolic distortion. Secondly, regardless of the natural resonant frequency of parallel resonant circuit 17 relative to the pulse repetition frequency, the output voltage always undergoes some distortion as a result of being generated by oscillation of a resonant circuit. This variety of distortion manifests itself as a small sine wave having a period equal to the trace portion 10 and superimposed thereon. This distortion may be denominated sinusoidal distortion.

In accordance with the present invention, parabolic distortion of the output waveform is corrected by a voltage supplied from parabolic waveform correction network 11. The parabolic waveform correction network 11 comprises an inductance 23 and a capacitance 24 coupled in series across input terminals 1 and 2. A junction 25 between inductor 23 and capacitor 24 is coupled via capacitor 26 to output terminal 6 by a conductor 27.

Inductance 23 presents a high impedance and capacitance 24 presents a low impedance to current flow at the pulse repetition frequency of the pulses supplied to terminal 1. In addition, inductance 23 and capacitance 24 are selected to have a series resonant frequency much less than the pulse repetition frequency. Therefore, when steady state conditions are reached, inductance 23 acts as an integrator to supply a sawtooth waveform current to capacitance 24. Capacitance 24, in turn, is effective to integrate the sawtooth waveform current and thereby provide a parabolic voltage at junction 25. The parabolic waveform voltage generated at junction 25 is connected through capacitance 26 to output terminal 6 by the conductor 27. In general, the amount of parabolic waveform voltage added increases as the ratio between the capacitance of capacitor 26 and the summation of capacitances of capacitors 20 and 21 increases.

In order to provide correction for the sinusoidal distortion of the output waveform, a sinusoidal waveform correction network 12 is provided. As shown, network 12 includes an inductance 28 and a capacitance 29 coupled in a parallel circuit relationship and in series with a capacitance 30 across output terminals 5 and 6. Network 12 may be considered either as a voltage generator, as was network 11 in which case network 12 supplies a negative sine wave voltage to the output terminal 6, or preferably, network 12 may be considered as a variable impedance disposed across output terminals 5 and 6. Viewed from the latter standpoint, the parallel connected inductance 28 and capacitance 29 are selected to provide a natural parallel resonant frequency slightly in excess of the pulse repetition frequency. Therefore, the combination of inductance 28 and capacitance 29 appears slightly inductive at the operating frequency. Capacitor 30 is then selected to provide series resonance of correction network 12 substantially at the operating frequency determined by the pulse repetition frequency.

With such a selection of components, a since wave of current having a period equal to the duration of the trace portion of waveform 7 will flow during each trace portion 10, diverting energy in the form of a sine wave from terminal 5 to terminal 6. This is equivalent to subtracting a sine wave of voltage from the output voltage waveform, thereby providing the desired sinusoidal waveform correction. The magnitude of correction is controllable by varying the capacitance of capacitor 30, and in the event that a significant range of adjustment is desired, either inductance 28 or capacitance 29 should be variable to maintain the desired series resonance of network 12.

Figure 2:
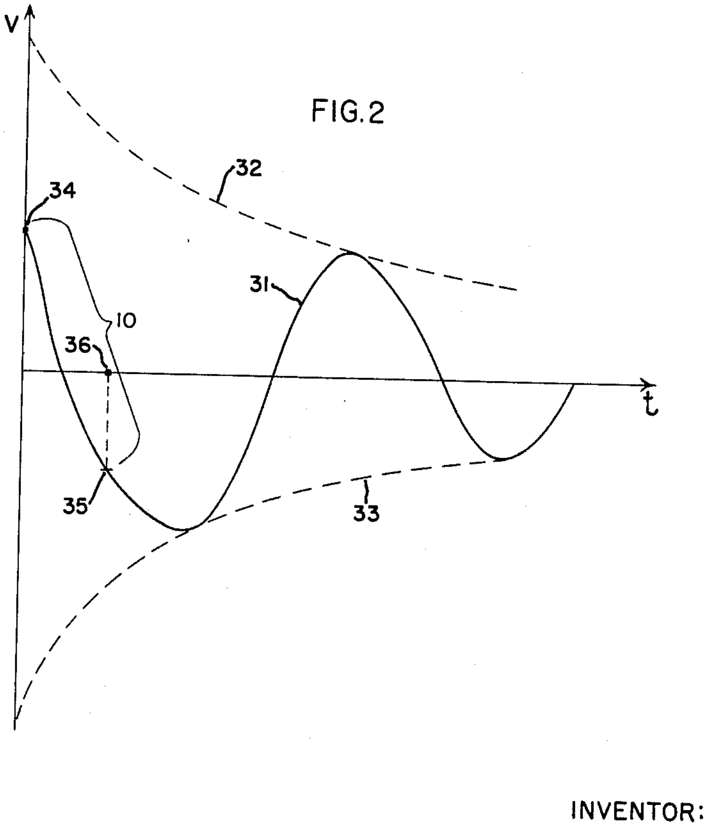
FIGURE 2 is a graphical representation of an exponentially decaying sine waveform voltage.

In order to more clearly explain the effect of the correction networks of this invention, it is necessary to refer to FIGURE 2, which more distinctly indicates the two varieties of distortion inherent in sawtooth waveform generators utilizing a pulsed resonant circuit, such as pulse converter network 9. Referring now to FIGURE 2, there is shown therein a generally sinusoidal voltage waveform 31 of exponentially decreasing amplitude as defined by dashed lines 32 and 33. Voltage waveform 31 corresponds to the voltage which is developed across a parallel resonant circuit which has been excited and then isolated to supply energy to a predetermined useful load. The rapidity with which the amplitude limits defined by dashed lines 32 and 33 approach the horizontal axis is directly related to the energy extracted from the circuit, and increases with increases therein. The line between point 34 and point 35 spans the region of present interest on waveform 31.

In operation, each occurrence of a positive pulse in pulse converter network 9, of FIGURE 1, causes parallel resonant circuit 17 to assume a voltage such as shown at 34 on waveform 31. Thereafter, upon termination of the pulse, the resonant circuit oscillates, or "rings," over a portion of a cycle to provide a voltage output of waveform generally shown between points 34 and 35. This is the trace portion 10 of the output voltage supplied to terminals 5 and 6. It should be noted that the proportion of waveform 31 which is spanned by trace portion 10 is much larger in FIGURE 2, for illustrative purposes, than would normally be the case in a practical pulse converter.

With the benefit of the exaggerated trace portion 10, disposed between points 34 and 35 of waveform 31 in FIGURE 2, the sinusoidal distortion of the portion of interest is readily apparent. Also, the parabolic distortion may be pointed out by noting that the change in curvature of the waveform does not occur at the horizontal axis, but rather at some small distance above the horizontal axis. The latter distortion is introduced by virtue of the exponentially decaying magnitude of the waveform which is caused by the loading of the resonant circuit. The time 36 during which the resonant circuit is allowed to oscillate, or "ring," is determined primarily by the pulse repetition frequency. At time 36 the circuit is interrupted and once again abruptly shifted to a point such as 34, along retrace portion 22 of waveform 7 as seen in FIGURE 1, and another trace portion is generated substantially as previously described.

The linearity of trace portion 10 of the output voltage may be increased by further decreasing the natural resonant frequency of the parallel resonant circuit which is pulsed. Of course, there is a limit to which this expedient may be carried, and usually this is determined by the available pulse energy. As the frequency of the parallel resonant circuit, such as 17 in FIGURE 1, is decreased, the energy required from the pulse source to abruptly terminate oscillations and condition the circuit for another trace is increased. Thus, it may be seen that the efficiency with which the pulse converter network performs its assigned function decreases as the circuit is altered in order to provide increased linearity.

Referring now to the graphs of FIGURES 3*a*–3*e* and 4*a*–4*e*, FIGURE 3*a* presents an expanded view of that portion of waveform 31, in FIGURE 2, extending from point 34 to point 35. Dashed line 37 represents the desired linear sawtooth waveform. For purposes of illustration, the actual waveform 38 between points 34 and 35 has been greatly exaggerated in order to more clearly point the varieties of distortion. It should be understood that the waveform as viewed on a normal oscilloscope of good quality would be indistinguishable from dashed line 37. Therefore, in the actual analysis, waveform 38 is differentiated to obtain the rate of change of voltage with time as illustrated by waveform 39 of FIGURE 4*a*.

In the various graphs of FIGURES 4*a*–4*e*, the negative of the voltage change with respect to time has been plotted since the desired rate of change, as indicated by dashed lines 40, is negative. In FIGURES 4*a*, 4*c* and 4*e* the various solid curves represent deviations from the desired slope as indicated by dashed lines 40, whereas in FIGURES 4*b* and 4*d* the differentials are plotted with reference to a zero horizontal axis.

In FIGURE 4*a* dashed line 40 represents the desired differentiated waveform of constant magnitude, such as results from differentiating a wave of the form shown by dashed line 37 of FIGURE 3*a*. Waveform 39 shows what will be actually observable on an oscilloscope when differentiating a waveform, such as 38 of FIGURE 3*a*, having the two varieties of distortion illustrated therein. In FIGURES 4*a*–4*e*, each of the lettered graphs shows the time differential of the voltage waveform of correspondingly lettered graphs of FIGURES 3*a*–3*e*.

FIGURE 3*b* shows a negative sine waveform 41 of the type which sinusoidal waveform correction network 12 of FIGURE 1, may be considered to introduce into the output voltage of pulse converter network 9. As mentioned before in connection with the explanation of sinusoidal waveform correction network 12, operation of this network is more easily conceived by considering the network to shunt such a negative waveform current between output terminals 5 and 6, although the result is the same. Of course, it would have been equally proper to show voltage waveform 41 as a positive sine wave and refer to subtracting such a voltage from the output. In FIGURE 4*b* it can bseen from waveform 42 that the negative differential of waveform 41 of FIGURE 3*b* is a cosine waveform.

In FIGURE 3*c*, waveform 43 shows the resulting trace portion of the output voltage when waveform 41 is added to waveform 38. From waveform 43 of FIGURE 3*c* it appears that the waveform resulting after sinusoidal waveform correction has too great a slope during approximately the first half of the trace portion and too little slope during the remainder thereof. This is verified by reference to curve 44 of FIGURE 4*c*.

Waveform 45 of FIGURE 3*d* corresponds to the correction voltage supplied from the parabolic waveform correction network, such as 11 of FIGURE 1, to the output of the pulse converter network 9. Waveform 45 is generally parabolic, and its differential, as represented by line 46 in FIGURE 4*d*, is a straight upwardly sloping line.

Waveform 47 of FIGURE 3*e* is even more greatly exaggerated than was waveform 38 of FIGURE 3*a*, in order to more clearly point out the remaining distortion of waveform 47. As shown, waveform 47, which is the resultant of adding the waveforms of FIGURES 3*c* and 3*d*, adheres relatively closely to the desired waveform shown by dashed line 37. In order to more accurately indicate the improved waveform achieved by using this invention, reference should be had to the differentiated waveform of FIGURE 4*e*.

In order to summarize the effectiveness of the present invention, reference will be had to FIGURES 4*a*, 4*c* and 4*e*, which have been drawn to substantially the same scale for purposes of an accurate comparison. Waveform 39 of FIGURE 4*a* may be contrasted with the desired waveform indicated by dashed line 40, and is characteristic of the output voltage derived from a pulse converter network having both parabolic and sinusoidal distortions. In the waveform of FIGURE 4*c*, and more particularly by comparing waveform 44 with the desired waveform 40, it may be seen that the sinusoidal distortion has been substantially eliminated, although parabolic distortion is evident. Such distortion is sometimes referred to in the art as "tilt," for obvious reasons. Waveform 48 of FIGURE 4*e*, which closely follows the desired waveform 40, results from correcting the parabolic distortion evidenced by waveform 44 of FIGURE 4*c*.

In a practical circuit utilizing only a pulse converter network, such as 9 of FIGURE 1, and no distortion correction the optimum arrangement of components was found to yield a differentiated waveform, such as 39 of FIGURE 4*a*, having a linearity deviation of 2.5%. By utilizing a parabolic waveform correction network and a sinusoidal waveform correction network, such as 11 and 12 respectively of FIGURE 1, the linearity deviation was reduced to 0.45%. Thus by utilizing the teaching of this invention, the linearity was improved by a factor of more than 5.

From FIGURE 4*e* it can be seen that there is a small amount of sinusoidal distortion remaining in the output waveform. In circuit applications wherein the additional expense to achieve even greater linearity is justified, further correction can be achieved by adding to the output voltage a small negative cosine-wave voltage of period equal to one and one-half times that of the trace period.

FIGURE 5 illustrates an embodiment of this invention which is particularly well adapted to energize a "push-pull" electric field deflection system. Shown therein is a pulse transformer 50, which may be a somewhat conventional transformer but having high leakage reactance, with a winding thereon having a center tap 51, which is grounded. Terminal 52 is connected to a portion of the winding on transformer 50 to supply energy thereto in a manner analogous to that of the input of an autotransformer. A negative sawtooth waveform 53 of current is supplied to terminal 52 and energy is stored in transformer 50 during the trace portion and abruptly discharged during the retrace portion. The latter operation supplies a positive pulse to pulse converter network 9, and a negative pulse to a pulse converter network 54. Pulse converter network 54 differs from pulse converter network 9 only by having a diode 55 thereof reversed in polarity with reference to diode 13.

In the circuit of FIGURE 5, a sawtooth waveform voltage of negative slope is generated between terminals 5 and 6 and a similar voltage, although of positive slope, is generated between terminals 56 and 5. Thus a "push-pull" output is realized which may be particularly desirable in some systems, wherein opposing deflection plates of an electric field deflection system, for example, may be attached to terminals 6 and 56, respectively.

In order to conserve on the use of components and to provide a balanced output stage, a parabolic waveform correction circuit 11 is associated with the pulse converter network which supplies the sawtooth voltage of negative slope and a sinusoidal waveform correction network 12 is associated only with the pulse converter network which supplies the sawtooth waveform of positive slope. Each correction network is adjusted to over-compensate, preferably by a factor of 2, its associated pulse converter network output voltage whereby the total output voltage generated between terminal 6 and terminal 56 is adequately compensated for both parabolic and sinusoidal distortion.

There has been shown and described herein means for correcting the distortion inherent in sawtooth waveform voltage generators of the type utilizing a resonant circuit pulse converter network. The distortion is corrected, or compensated for, by correction networks which operate in combination with the pulse converter network and require no special external sources of energization. By utilizing the subject invention, it has been shown that the linearity of the basic sawtooth waveform voltage generator circuit is improved by more than five to one. In systems wherein great linearity is required, it may be provided by utilizing a pulse converter network in combination with the teaching of this invention. In systems wherein the linearity requirement is not so severe, a sawtooth waveform voltage generator of the pulse converter network type may be utilized with greatly increased efficiency by utilizing the distortion correction networks of the present invention. Greater efficiency may be realized by increasing the frequency of the parallel resonant circuit used in the pulse converter network, for example, by reducing the magnitude of the capacitance associated therewith. In addition it is apparent that both improved linearity and increased efficiency may be realized simultaneously by a compromise between the aforementioned alternatives.

While this invention has been described with reference to two specific embodiments thereof, it should be understood that many modifications and variations of the specific circuits disclosed will occur to those skilled in the art. It is therefore intended by the appended claims to cover all modifications and variations falling within the true spirit and scope of the subject invention.

What is claimed as new and desired to be secured by Letters Patent of the United States is:

1. A sawtooth waveform voltage generator comprising: a pulse converter network having a parallel resonant circuit and having means adapted to connect intermittently said parallel resonant circuit to a source of pulses having a high repetition frequency relative to the resonant frequency of said parallel resonant circuit; and a sinusoidal waveform correction network connected in parallel circuit relationship with said parallel resonant circuit, said sinusoidal waveform correction network exhibiting series resonance at a frequency substantially equal to said repetition frequency, to provide compensation for the sinusoidal distortion of said pulse converter network.

2. The generator of claim 1 wherein said sinusoidal waveform correction network comprises a parallel resonant circuit having a resonant frequency higher than said repetition frequency and a capacitor in series circuit relationship therewith.

3. A sawtooth waveform voltage generator comprising: a source of pulses having a predetermined repetition frequency; a pulse converter network having a parallel resonant circuit with a lower resonant frequency than said repetition frequency, said converter network including means connected to said source and adapted to connect said source to said parallel resonant circuit only during the occurrence of said pulses; a parabolic waveform correction network connected to said source of pulses and responsive to the output from said source to provide a voltage of parabolic waveform; and coupling means connected from said parabolic waveform correction network to the output of said pulse converter network for transmitting said voltage of parabolic waveform thereto, to provide compensation for the parabolic distortion of said pulse converter network.

4. The generator of claim 3 wherein said parabolic waveform correction network includes a double integrator circuit comprising an inductor and a capacitor connected in series circuit relationship across said source of pulses, said inductor and said capacitor having a combined series resonant frequency much lower than said repetition frequency.

5. The generator of claim 4 wherein said coupling means comprises a coupling capacitor, said coupling capacitor having one terminal connected to the junction of said inductor and said capacitor.

6. In a sawtooth waveform voltage generator including a pulse converter network having a parallel resonant circuit with a relatively low resonant frequency and means arranged to connect intermittently said parallel resonant circuit and a source of pulses of relatively high repetition frequency, said means including an asymmetrically conductive device and biasing means therefor, the improvement comprising: a sinusoidal waveform correction network connected in parallel with said parallel resonant circuit and having a series resonant frequency substantially equal to said repetition frequency, a parabolic waveform correction network adapted to be connected to said source of pulses and responsive to the output from said source to provide a voltage of parabolic waveform, and coupling means connected from said parabolic waveform correction network to the output of said pulse converter network for transmitting said voltage of parabolic waveform thereto, whereby the distortion in said pulse converter network is substantially compensated.

7. The generator of claim 6 wherein said sinusoidal waveform correction network comprises a parallel resonant circuit having a resonant frequency higher than said repetition frequency and a capacitor in series circuit relationship therewith.

8. The generator of claim 7 wherein said parabolic waveform correction network includes a double integrator circuit comprising an inductor and a capacitor connected in series circuit relationship across said source of pulses, said inductor and said capacitor having a combined series resonant frequency much lower than said repetition frequency.

9. The generator of claim 8 wherein said coupling means comprises a coupling capacitor, said coupling capacitor having one terminal connected to the junction of said inductor and said capacitor.

10. A sawtooth waveform voltage generator having a push-pull output comprising: a source of positive pulses of predetermined frequency and a source of negative pulses of said predetermined frequency; a first pulse converter network connected to said source of positive pulses and responsive to the pulses therefrom to provide a sawtooth waveform output voltage of negative slope and having sinusoidal and parabolic distortions; a second pulse converter network connected to said source of negative pulses and responsive to the pulses therefrom to provide a sawtooth waveform output voltage of positive slope and having sinusoidal and parabolic distortions; a sinusoidal waveform correction network connected across the output of said first pulse converter network and having a series resonant frequency substantially equal to said predetermined frequency, said sinusoidal waveform correction network being arranged to provide over-compensation for the sinusoidal distortion of said first pulse converter network; a parabolic waveform correction network connected to said source of negative pulses and responsive to the pulses therefrom to provide a voltage of parabolic waveform; and, coupling means connected from said parabolic waveform correction network to the output of said second pulse converter network for transmitting said voltage of parabolic waveform thereto, said coupling means and said parabolic waveform correction network being arranged to provide over-compensation for the parabolic distortion of said second pulse converter network; whereby the total output voltage of said generator is compensated for both sinusoidal and parabolic distortions.

No references cited.

MILTON O. HIRSHFIELD, *Primary Examiner.*